Patented June 13, 1939

2,162,532

UNITED STATES PATENT OFFICE 2,162,532

PRODUCTION OF ETHYL CHLORIDE

Walter Flemming, Ludwigshafen-on-the-Rhine, Karl Dachlauer, Hofheim-in-Taunus, and Erwin Schnitzler, Frankfort-on-the-Main-Hochst, Germany, assignors to I. G. Farbenindustrie Aktiengesellschaft, Frankfort-on-the-Main, Germany No Drawing. Application September 15, 1937, Serial No. 163,914. In Germany January 28, 1936

4 Claims. (Cl. 260—662)

The present invention relates to the production of ethyl chloride.

The processes for the preparation of ethyl chloride by chlorination of ethane in the gas phase in the presence of catalysts hitherto usual are unsatisfactory in practice, especially when operating continuously for long periods. Thus for example when using catalysts having large surfaces, especially active carbon, and even when using metal chlorides such as cuprous chloride, iron chloride or manganese chloride, a considerable over-chlorination and carbonization takes place, the result being that after a short time the activity of the catalysts ceases and the reaction vessel becomes clogged. Furthermore, by reason of the great heat of formation of the ethyl chloride, the usual processes require large reaction spaces and small throughputs in order to counteract in some degree the strong evolution of heat. The leading away of the heat of reaction is furthermore rendered especially difficult by the bad thermal conductivity of the usual catalysts. It has already been proposed to avoid over-chlorination and to lead away the heat better by using the ethane in excess, for example in the ratio of 10 molecular proportions of ethane to 1 molecular proportion of chlorine. Working in this way has the drawback, however, that the separation of the resulting ethyl chloride from the reaction mixture is rendered extremely difficult and moreover that the high absorptive power of the catalysts having a large surface and of the metal chlorides for the chlorination products formed contrasted with the small absorptive power for ethane does not allow the increase in the ethane content of the reaction mixture to become effective.

We have now found that ethyl chloride can be obtained in good yields by the chlorination of ethane while avoiding the said drawbacks by performing the chlorination at temperatures between 400° and 700° C. within small catalyst zones and using a crystalline carbon, more particularly lustrous carbon, graphitic carbon and graphite, as catalysts.

The strong heating of the catalyst, hitherto considered injurious, is made use of according to this invention so that the chlorination proceeds as a kind of combustion. Even with a practically equimolecular ratio of chlorine to ethane, the chlorination yields mainly ethyl chloride, without the latter decomposing to any substantial extent. This is the more surprising because ethyl chloride is split up into ethylene and hydrogen chloride to the extent of about 90 per cent even at 300° C. and practically completely split up at 350° C. by many catalysts, including almost all metal chlorides, such as the chlorides of chromium, iron, nickel, manganese and zinc. The process according to this invention offers the further great advantage that considerably larger amounts of ethane can be caused to react with chlorine per unit of time and space than has been possible by prior processes.

The crystalline carbon used as catalyst in this process favors the chlorination process but not the undesirable decomposition of ethyl chloride into ethylene and hydrogen chloride. The said crystalline carbon also has the advantageous property that by its use the formation of a loose layer of carbon black is prevented, which formation would otherwise be caused by a decomposition leading to carbon and which would lead to a more far-reaching chlorination of the ethyl chloride and stoppage of the reaction vessel. On the contrary a separation of carbon is practically completely suppressed by the use of graphite, graphitic carbon, lustrous carbon and like kinds of crystalline carbon. Even when it does take place to a slight extent, it mainly acts to form a lustrous smooth coating of lustrous carbon which not only does not impair the chlorination but even promotes it.

The chlorination proceeds especially advantageously when the said catalyst is used in the form of a thin coating on carriers which are thermal conductors. In this way the considerable amounts of heat arising during the chlorination are led away very smoothly, even when the catalyst is loaded highly.

As materials for the walls of the reaction vessel and for the carrier upon which the catalyst may be applied there may be mentioned materials which are sufficiently stable to corrosion and which have a good thermal conductivity. It is therefore preferable to use metals or metal alloys which are relatively stable to chlorine and hydrochloric acid, as for example chromium-nickel alloys, platinum or silver. By coating the said metals with a layer of lustrous carbon, their resistance to corrosion is still further increased. Catalyst carriers which are converted into metal chlorides under the reaction conditions should be avoided because the presence of such chlorides would effect the decomposition of the ethyl chloride formed into ethylene and hydrogen chloride. The carriers for the catalyst may be used in compact pieces, wires, chips or the like. It is especially suitable to use wire nets which may be adapted to the shape of the reaction chamber by being rolled or folded together. The reaction vessel is advantageously so arranged that the heat formed may readily be led away. When carrying out the chlorination on a small scale it is preferable to work in tubes; in the case of larger reaction vessels they are given a narrow form such as, for example, the form of a sheath or a bag or are provided with tubular coolers. The coating of the carriers or the walls of the vessel with a layer of crystalline carbon is effected by painting on a thin layer of tar oil to which fine graphite powder may be added if desired. This film is then burnt onto the metallic basis for example at from 400° to 500° C. If the ethane used contains small amounts of higher hydrocarbons, such as is usually the case with industrial gases, the previous "graphiting" may be entirely dispensed with. The catalyst carrier and the walls of the vessel then very soon become coated with a fine coating of lustrous carbon during the reaction; this coating practically protects the underlying metal from corrosion in the same way as a directly-applied coating of carbon.

The withdrawal of heat is effected in the usual manner, for example by leading water or cooling liquids through tubes situated in the reaction chamber or by cooling the walls of the vessel. It is very suitable to lead away the heat by means of metal baths, for example by alloys which are liquid when hot or by metallic mercury.

The chlorination may be carried out for example by preheating the reaction chamber to about 300° C. and then leading through the mixture of ethane and chlorine; mixtures containing up to 1 molecular proportion of chlorine for 1¼ molecular proportions of ethane may be used without difficulty. The reaction commences after a short time and the temperature rapidly rises to from 500° to 600° C. within a very small zone of the catalyst of a length of from about 1 to 3 centimetres in the longitudinal direction of the flowing gases. The temperature at the catalyst may be reduced to 400° C. by cooling, but this measure is unnecessary having regard to the scarcely diminished yield at the said higher temperatures, and moreover at lower temperatures there exists the danger that the reaction may stop. The reaction gases are cooled after leaving the catalyst; the hydrogen chloride is removed, preferably by washing, the ethyl chloride dried and then liquefied by cooling or compression. The chlorine introduced is completely used up. The ethane reacted is converted to the extent of about 80 per cent into ethyl chloride and to the extent of about 20 per cent into ethylidene and ethylene chlorides, the ratio by weight of the two last mentioned substances being about 2:1. Higher chlorine compounds do not occur in appreciable amounts.

The reaction may also be carried out in the presence of indifferent gases or vapours. In particular it is possible to convert the ethane contained in industrial gases containing ethane into ethyl chloride.

The following example will further illustrate how our present invention may be carried out in practice but the invention is not restricted to this example.

*Example*

The chlorination is carried out in a tube 80 centimetres long and having an internal diameter of 2 centimetres and made of chromium-nickel steel. The catalyst carrier consists of a chromium-nickel wire net wound up into a roll of 25 centimetres length which may readily be pushed into the tube. Before the reaction the tube and the wire net are coated with a film of carbon by painting them with a thin film of brown coal tar oil with which are incorporated 10 per cent of finely powdered graphite and then heating for half an hour at from 400° to 500° C. in a weak current of nitrogen or carbon dioxide. The excess of tar oil is then removed. The wire roll lies in the centre of the tube; heating is effected by means of a metal bath consisting of equal parts of tin and antimony. The air is expelled from all parts of the apparatus by means of ethane and the tube and catalyst heated to about 300° C. (determined at the catalyst). A mixture of 150 litres of chlorine and 188 litres of ethane per hour is led continuously over the catalyst. The chlorination commences at one point of the catalyst after a short time and remains limited to a zone of from about 1 to 2 centimeters which moves more or less markedly backwards and forwards over the whole length of the catalyst. The temperature rises and under the said conditions of flow remains at from about 570° to 600° C. Further heating from outside is then superfluous; on the contrary the cold metal bath, originally used for heating, serves as an excellent conductor of heat. The reaction tube is preferably connected with a water-cooler, several washing towers in which the hydrogen chloride is washed out with water, one or more drying towers and finally with a cooling device for the liquefaction of the chlorinated hydrocarbons formed. The residual gas, consisting of the excess of ethane and small amounts of ethylene, is returned to circulation by means of a gas pump.

The chlorine is reacted completely. At the high flow conditions used the yield of ethyl chloride amounts to 71 per cent and 29 per cent of dichlorethane are also formed. The remainder of the ethane remains unchanged. By reducing the speed of flow, i. e., the load on the catalyst, or by increasing the proportion of ethane, the yield of ethyl chloride is further increased. If, under otherwise identical conditions, 90 litres of chlorine and 180 litres of ethane be led over the catalyst per hour, the chlorination proceeds at about 550° C. and a reaction mixture is obtained consisting of 80.5 per cent of ethyl chloride and 19.5 per cent of dichlorethanes.

What we claim is:

1. In the production of ethyl chloride by chlorination of ethane in the gas phase the steps which comprise performing the chlorination at temperatures between 400° and 700° C. within small catalyst zones and using as material for the reaction chamber and the catalysts metals which are inert to chlorine under reaction conditions, and on the surfaces of which a thin coating of crystalline black carbon is deposited.

2. In the production of ethyl chloride by chlorination of ethane in the gas phase the steps which comprise performing the chlorination at temperatures between 400° and 700° C. within small catalyst zones and using as material for the reaction chamber and the catalysts metals which are inert to chlorine under reaction conditions, and on the surfaces of which a thin coating of lustrous carbon is deposited.

3. In the production of ethyl chloride by chlorination of ethane in the gas phase the steps which comprise performing the chlorination at temperatures between 400° and 700° C. within small catalyst zones and using as material for the reaction chamber and the catalysts metals which are inert to chlorine under reaction conditions, and on the surfaces of which a thin coating of graphitic carbon is deposited.

4. In the production of ethyl chloride by chlorination of ethane in the gas phase the steps which comprise performing the chlorination at temperatures between 400° and 700° C. within small catalyst zones and using as material for the reaction chamber and the catalysts metal alloys which are inert to chlorine under reaction conditions, and on the surface of which a thin coating of crystalline black carbon is deposited.

WALTER FLEMMING.
KARL DACHLAUER.
ERWIN SCHNITZLER.